United States Patent Office 3,489,711
Patented Jan. 13, 1970

3,489,711
OXIDATIVE POLYURETHANES WITH
SILICON CARBIDE
Ronald V. Nesheim, Winter Park, Fla., assignor to The Battelle Development Corporation, Columbus, Ohio
No Drawing. Continuation-in-part of application Ser. No. 337,526, Jan. 14, 1964. This application Sept. 18, 1967, Ser. No. 668,663
Int. Cl. C08g 51/12
U.S. Cl. 260—33.6
10 Claims

ABSTRACT OF THE DISCLOSURE

A sprayable coating composition comprising an organic solvent solution of an oxidative polymerizable polyurethane resin having granular silicon carbide particles dispersed therein and a surface having a dried coating film of the composition thereon.

---

This application is a continuation-in-part of applicant's copending application bearing the same title which was filed Jan. 14, 1964, as Serial No. 337,526, now abandoned.

This invention concerns the art of protective coatings. More particularly it relates to a sprayable protective organic coating composition comprising an organic solvent solution of an oxidative polymerizable polyurethane resin having granular silicon carbide particles dispersed therein. The invention includes providing surfaces with a coating of such a composition and also a dried coating film of the composition on surfaces so as to render the surfaces resistant to various environments and at the same time highly resistant to abrasion.

In the past in the coating field when one desired to coat a surface with a combination polymeric substance containing solid inclusions, it has been the practice to first coat the surface with a layer of the polymer and then spread the solid particles on the tacky surface. This could then be followed with an additional layer of polymer, if desired. It has now been unexpectedly discovered that it is possible to combine the polymer and abrasive prior to applying them to the surface. More specifically, it has been discovered that oxidative polymerizable polyurethane resin may be combined with silicon carbide particles and dispersing agent and sprayed directly on to a surface thus doing away with a time consuming multi-step process. In the past oxidative polymerizable polyurethane resins have been used in coating compositions and also solvent solutions of such resins along with driers, some pigments, and the like have been used in coating compositions. However to applicant's knowledge none of the past coating compositions containing oxidative polymerizable polyurethane resins also have contained any significant amounts of granular silicon carbide particles and no one previously has recognized superior protection obtainable from a sprayable coating composition containing both the oxidative polymerizable polyurethane resin and granular silicon carbide particles.

It is an object of this invention to provide a coating which will provide unexpected protection to a surface exposed to a corrosive environment such as hydrocarbon products or salt spray. The unique protective characteristics of the instant coating composition render it particularly adaptable to use as a coating for the hulls of ships and as a liner material for hydrocarbon carrying tankers.

It is a further object of this invention to provide a one-step coating composition which exhibits practically universal bonding characteristics and can be successfully and readily applied to all major construction and industrial materials such as wood, steel, concrete, galvanized metal and aluminum.

The objects of this invention are accomplished by coating the desired surface with a solution of an oxidative polymerizable polyurethane resin which has included therein a uniform and homogenous suspension of silicon carbide particles. It is further within this invention to provide a composition of the polyurethane and silicon carbide particles which can be applied to a desired surface in a single application, as by spraying, and to provide surfaces having a dried coating film of the composition thereon.

The essential constituents of the coating composition are three, namely, an oxidative polymerizable polyurethane resin, an organic solvent for the resin, and silicon carbide particles. Desirably and preferably the composition also includes a suspending agent for the silicon carbide particles to assure a homogenous distribution of the silicon carbide particles. As will be apparent from the teachings and specific examples of this disclosure various additional constituents may be and generally are included in the composition for various specific purposes. Thus, driers, colorants, pigments, bodying agents, antiskin agents, antisag agents, and the like additives can be included in the composition when desired for the particular coating application's purposes. Other constituents also may be included for purposes known to the art so long as they do not detract significantly from the sprayable and protective properties of the coating composition of the invention.

The instant invention has shown many unexpected properties. One would not normally expect that the addition of silicon carbide particles to a polyurethane coating would increase the resistance of the polyurethane to corrosive environment. It has been found, however, that when silicon carbide particles are uniformly dispersed in the oxidative polymerizable polyurethane resin, that the resistance to deterioration increases appreciatively. I do not know what mechanism occurs, which would explain this phenomenon, but the unexpected life of the coating in contact with various environments would indicate that some mechanism occurs which produces a polyurethane modified by the carbide particles.

Of major consideration for preparing the coating composition of the invention is that an oxidative polymerizable polyurethane resin be employed. Oxidative polymerizable polyurethane resins sometimes are called "urethane oils" or "uralkyds" or "isocyanate modified drying oils" (for example, see: Polyurethanes: Chemistry and Technology, Part II, Saunders and Frisch, John Wiley & Sons, Inc., Publishers (1964), pages 460–462) and are well known to the art. The oxidative polymerizable polyurethane resins also have been designated under an ASTM classification as a Type 1 urethane vehicle (Patton, T. C., Off Digest, 34, pages 342–44 (1962)). This Type 1 urethane vehicle is a one-package, pre-reacted vehicle which cures essentially by oxidation and in this respect differs from other designated ASTM one-package urethane vehicles whose curing involve such other mechanisms as moisture- or heat-curing. It differs in its one-package or one-component aspect from ASTM designated two-package or two-component urethane vehicles which require two components or constituents. The oxidative polymerizable polyurethane resins are the reaction products of diisocyanates with hydroxyl containing drying oil derivatives and are characterized by the absence of any significant amount of free isocyanate groups. The oxidative polymerizable polyurethane resins generally are formulated to have an NCO/OH ratio of 1 or lower, with desirably their free diisocyanate content being zero. They generally are the reaction product of a polyisocyanate, such as a toluene diisocyanate or methylenebis-(4-phenyl isocyanate) or the like, and a polyhydric alcohol ester of vegetable oil acids, such as castor oil and castor oil derivatives or the like. Those showing the most general utility are the completely reacted urethane polymers having unsaturated fatty acid side chains. They are of general utility by offering a convenience of handling due to the ease with which they cure by the mechanism of oxidative polymerization. The use of the oxidative polymerizable resin avoids the time and expense of employing baking processes and the like required with some other types of urethanes to obtain a completely polymerized coating. Many oxidative polymerizable polyurethane resins are known to the art and are commercially available. As illustrative thereof one can employ for the oxidative polymerizable polyurethane resin such commercially available products as Tranco 160B, a product of Trancoa Chemical Corporation, or Spenkel F77, a product of the Spencer Kellog Division of Textron, Inc., to mention just two although numerous others also are available and can be employed. The two commercially available ones just mentioned each contain about 60 percent nonvolatile solids (i.e. the oxidative polymerizable polyurethane resin) in solution in mineral spirits and xylol, respectively, and are conveniently employed in that form for preparation of coating compositions of the invention.

Useful solvents for the coating composition are organic solvents having an appreciable solubility for the oxidative polymerizable polyurethane resin and desirably also having an appreciable volatility at conditions under which the applied coating composition is dried. The organic solvent may be a hydrocarbon solvent, such as mineral spirits, xylene, toluene, and like hydrocarbon solvents. Other known organic solvents, such as polar-type organic solvents used in coating compositions containing other type urethanes, also can be employed and advantageously they need not necessarily be the urethane-grade solvent required with some other type urethanes, that is, the organic solvent need not necessarily be free from water and other compounds containing active hydrogen capable of reacting with isocyanates as the herein employed Type 1 urethanes are essentially devoid of free isocyanate. Of course, nonsolvent diluents and the like may be included in minor amounts and a single organic solvent may be used or a mixture of compatible organic solvents employed. The amount of solvent employed should be sufficient to make the coating composition sprayable and to provide desired flow properties for the applied wet coating composition. For practical reasons the solids content of the composition generally is held as high as possible while still permitting spray application by conventional means and techniques. Suitable solvent amounts within the above requirements are illustrated by the specific examples presented herein, and as a general rule the organic solvent constitutes at least about 25 percent of the coating composition's weight in order to provide sprayability.

Suitable granular silicon carbide particles are readily available commercially. These silicon carbide particles can be easily dispersed by stirring in a polyurethane to form a homogenous matrix which can be sprayed directly to a surface. It has been found that good results are obtained when the particles used range in size from −200 to +400 mesh (U.S. Sieve Series). The smaller particles tend to bridge between the larger particles, thus providing a better protective coating and giving a longer wear life to the coated surface. To permit sprayability of the coating composition in commercially available equipment by conventional techniques and without modification of spray nozzle orifice opening size and the like, silicon carbide particles larger than retained on a No. 35 U.S. Sieve, i.e. particles larger than about 500 microns, are not included in the composition. Preferably and most desirably greater than 97 to 98 percent of the particles pass through a No. 100 U.S. Sieve, i.e. are particles smaller than 149 microns, and the average size of the particles falls between 5 and 50 microns. Screen analyses of two commercially available silicon carbide products, established as useful for the coating composition, are tabulated in the following Table I. For identification purposes one is called a coarse silicon carbide and the other a fine silicon carbide, although both can be deemed to be of relatively fine particles with the coarse silicon carbide of an average particle size of between 26 and 37 microns and the fine silicon carbide of an average particle size of between 4.5 and 9 microns.

TABLE 1.—SILICON CARBIDE PARTICLE SIZES

| U.S. Sieve No. | Size (microns) | Weight Coarse SiC | Fine SiC [1] |
|---|---|---|---|
| On 40 | >420 | 0.0 | 0.0 |
| On 50 | >297 | 0.4 | 0.07 |
| On 100 | >149 | 2.0 | 0.3–0.6 |
| On 200 | >74 | 17.2 | 1.6–2.7 |
| On 325 | >44 | 23.5 | 3.4–5.5 |
| Thru 325 | <44 | 56.9 | 91.1–93.3 |
| On 400 | >37 | | 2.0–3.0 |
| Thru 400 | <37 | | 90.0–92.0 |

[1] A reported chemical analysis for this fine silicon carbide is:

| | Percent |
|---|---|
| True SiC | 88.0–91.5 |
| Free C | 2.5–3.5 |
| Free Si | 0.6–1.0 |
| Free Fe | 1.5–2.0 |
| Free Al | 0.3–0.5 |
| Free SiO$_2$ | 5.0–6.5 |

Generally the employed amount of ganular silicon carbide particles dispersed in the coating composition for most applications constitutes between 25 and 50 percent of the coating composition's weight and, in relation to the oxidative polymerizable polyurethane resin solids, falls within the ratio of ½ to 2 parts of silicon carbide particles for each part of the resin solids. Where the ratio of silicon carbide particles to the resin solids exceeds about 2 to 1, the resulting dried coating is more susceptible to chalking and other deterioration than if the ratio falls between ½–2 to 1. Where the ratio of silicon carbide particles to the resin solids falls below about ½ to 1, the significant improvement and superiority of properties of the resulting dried coating over the resulting dried coating of a like coating composition except without silicon carbide particles therein, is appreciably diminished and at extremely low ratios apparently not detectable.

The particular suspending agent used does not appear to be of any importance. Various suspending agents have been used with no apparent change in the properties of the coating material. Use of a suspending agent facilitates the blending and uniformly dispersing of the silicon carbide particles in the composition. It also apparently aids in maintaining these particles iu suspension during storage of the prepared coating composition and facilitates their redispersion should they settle out. I have found that the commercially available and economical suspending composition "Bentone 38," a product of National Lead Corp., is satisfactory for my purposes. "Bentone 38" is reported by its producer to be an "organic derivative of a special magnesium montmorillonite." Another useful suspending agent is "Bentone 34," also a product of the National Lead Corporation, which is dimethyldioctadecyl ammonium bentonite. Other suspending agents known to the coatings art also are contemplated as useful. Generally the suspending agent constitutes less than 1 percent of the coating composition's weight.

As already mentioned various other additional constituents may be included in the composition and will be apparent from the teachings herein. Particularly useful are small amounts, generally less than 1 percent of the coating composition's weight, of driers, such as metal naphthenates, known to the art to expedite the oxidative curing of the oxidative polymerizable polyurethane resin. Such driers accelerate the oxidation cure, although the cure will take place reasonably rapidly without their presence in normal atmospheric environments.

An especially preferred coating composition of the invention comprises:

| | By weight of the composition |
|---|---|
| 40–70 percent solids solution of an oxidative polymerizable polyurethane resin in an organic solvent therefor. | Balance (a) of composition. |
| Mineral spirits or xylol solvent. | To make at least 25% (b) total solvent content. |
| Granular silicon carbide particles of a size smaller than 500 microns and of an average particle size between 5 and 50 microns. | 25 to 50% (a). |
| Dispersing agent | Less than 1%. |
| Driers | Do. |
| Antiskin agent | Do. |
| To total | 100%. | wherein
(a) the amounts of said solid solution and said particles are such as to provide a ratio by weight of ½ to 2 parts of said particles for each part of oxidative polymerizable resin solids, and
(b) the at least 25% total solvent content includes the solvent contained in said solids solution of the oxidative polymerizable polyurethane resin, and
which said sprayable coating composition, after application and drying, is characterized by exhibiting resistance to various environmental exposures superior to said coating composition without the granular silicon carbide particles after its application and drying.

The following examples describe preferred embodiments of this invention and have been chosen merely for the purpose of illustrating the manner of preparation and the results obtained by the use of a coating comprised of an oxidative polymerizable polyurethane and silicon carbide.

EXAMPLE I

A composition comprised of an oxidative polymerizable polyurethane resin of a 40–60 percent solids grade in a mineral spirits solvent was sprayed on clean, dry steel test plates. A like polyurethane containing silicon carbide particles in the amount of about 4½ lbs. of carbide per gallon of polyurethane of −200 +400 mesh size stirred together with a dispersing agent was also sprayed on clean dry steel test plates. The coating on both sets of test plates were kept as thin as possible, (about 4 mils) to aid in rapid drying. The coating in both instances set to touch in 25 minutes and was tack free in 65 minutes.

Both sets of test plates were then subjected to salt spray tests in a standard salt spray cabinet at room temperature. The test plate coated with the polyurethane coating without silicon carbide showed blisters with cracking and corrosion at 200 hours. After 500 hours the test plates which were coated with the polyurethane silicon carbide coating showed no signs of blistering, cracking, or corrosion.

EXAMPLE II

A composition comprised of 40–60 percent solids grade of an oxidative polymerizable polyurethane resin in a xylol solvent and silicon carbide with "Bentone No. 38" as dispersing agent was sprayed on clean dry steel test plates. The coating was kept as thin as possible (about 4 mils) to aid in rapid drying. The coating set to touch in 10 minutes and was tack free in 15 minutes.

The plates were then heated to 300° F. and immersed in cold salt water at 30 minute intervals for 72 hours. An examination of the plates revealed no cracking, corrosion, or undercut blistering.

EXAMPLE III

A composition comprised of an oxidative polymerizable polyurethane resin of a 40–60 percent solids grade in a mineral spirits solvent was sprayed on clean, dry, steel test plates. A like polyurethane containing silicon carbide particles in the amount of 4½ lbs. of carbide per gallon of polyurethane of −200 +400 mesh size stirred together with the dispersing agent "Bentone No. 38" was also sprayed on clean, dry, steel test plates. The coating on both sets of test plates were kept as thin as possible, (about 4 mils) to aid in rapid drying. The coating in both instances set to touch in 25 minutes and was tack free in 65 minutes. Both sets of test plates were then immersed in gasoline. After 72 hours on the test plates, which were coated with polyurethane without silicon carbide, the coating had first blistered then softened and almost completely deteriorated. At the end of 150 hours on the test plates which were coated with the coating of polyurethane with silicon carbide, the coating was softened, but had not blistered and there was no evidence of deterioration. At the end of 300 hours there was no sign of further softening. Upon exposure to atmosphere, the polyurethane with silicon carbide hardened to its original state.

EXAMPLES IV THROUGH X

Coating compositions were prepared for Examples IV through X and they are tabulated in Table 2 which follows. A control composition without a silicon carbon content also was prepared for comparison purposes and also is tabulated in Table 2. The compositions of these examples were prepared generally through incrementally blending the dispersing agent, silicon carbide, and solvent with the 60 percent solids grade polyurethane resin over about a 20 minute period with mixing by using a high-shear, serrated-edge propeller mixer having a peripheral speed of 3500 to 5000 feet/min. After blending, the mixing was continued for about 15 minutes, whereupon the driers, which had been premixed together for about 5 to 10 minutes, were added and blended into the stirred mix and stirring continued for 3 to 4 minutes. The antiskin agent then was added with the mix being stirred for an additional 5 to 10 minutes whereupon it was ready for immediate usage or storage, as desired. Where stored and not used immediately, the compositions are stirred to a homogenous state just prior to usage. The control composition was prepared in a like manner except for no adding of dispersing agent and silicon carbide. Each of the compositions can be readily applied as coatings by spraying directly on the surface to be coated and, if desired, can be applied by a knife-blade draw-down and other coating techniques. If upon application in thick film coats to vertical surfaces, there is observed sagging of the wet coating, this sagging can be avoided by modification of the compositions set forth in Table 2 through adding and mixing therein about ½ to 1 percent by weight of a mixture of one part of 85 percent phosphoric acid and from 1 to 3 parts of ethanol or a commercially available alcohol-type solvent such as "Shellacol," a product of the Commercial Solvents Corporation.

TABLE 2.—COATING COMPOSITIONS
[Parts by weight]

| | Example No. | | | | | | | |
|---|---|---|---|---|---|---|---|---|
| | Control | IV | V | VI | VII | VIII | IX | X |
| Resin, oxidative polymerizable polyurethane (60% solids in mineral spirits) | 200.0 | 54.7 | 44.9 | 17.4 | 79.3 | 38.8 | 44.9 | 45.7 |
| Solvent, mineral spirits | | 11.5 | 9.4 | 3.5 | 16.7 | 8.1 | 8.9 | 9.0 |
| Silicon carbide: | | | | | | | | |
| Fine [1] | 0 | 32.8 | 18.0 | 9.8 | 47.6 | 15.3 | 44.9 | 0 |
| Coarse [2] | 0 | 0 | 27.0 | 0 | 0 | 23.3 | 0 | 27.4 |
| Dispersing agent, Bentone 38 | | 0.7 | 0.6 | 0.2 | 1.0 | 0.5 | 0.8 | 0.6 |
| Driers: | | | | | | | | |
| Cobalt naphthenate drier, 6% | 0.34 | 0.09 | 0.08 | 0.03 | 0.13 | 0.08 | 0.09 | 0.09 |
| Lead naphthenate drier, 24% | 0.42 | 0.10 | 0.09 | 0.03 | 0.15 | 0.10 | | 0.12 |
| Manganese naphthenate drier, 6% | | | | | | | 0.14 | 0.15 |
| Antiskin agent, Butyraldehyde oxide | 0.20 | 0.05 | 0.05 | 0.02 | 0.07 | 0.05 | 0.05 | 0.05 |
| Colorant: | | | | | | | | |
| Red paste [3] | | | | | | 42.0 | | |
| Green paste [4] | | | | 20.0 | | 13.8 | | 16.3 |

[1] Average particle size between 26 and 37 microns.
[2] Average particle size between 4.5 and 9 microns.
[3] A red colorant paste from blending a red pigment (for example Dark Red 516, a product of Columbia Carbon Co.) with 60% solids grade of the oxidative polymerizable polyurethane resin in a ratio by weight of 30 parts of the resin to 18 parts of the pigment.
[4] A green colorant paste from blending a green pigment (for example Chrome Oxide Green G-6099, a product of the C. K. William Co.) with 60% solids grade of the oxidative polymerizable resin in a ratio by weight of 30 parts of the resin to 18 parts of the pigment.

Clean dry sheet-steel test panels were coated respectively by a draw-down technique with one and two coats of the coating compositions of each of Examples IV through VIII and of the control composition to provide predetermined dry film coating thicknesses after drying. Duplicate panels of each example's coating and also of the control's coating were exposed to accelerated and outdoor weathering environments. The outdoor weathering exposure was with the panels facing on a southern exposure at a 60° angle in an area of suburban Columbus, Ohio, considered to have a "rural" atmosphere as opposed to a residential or industrial atmosphere. The accelerated weathering was performed in an Atlas TwinArc Weatherometer cycled to simulate 102 minutes of sunshine (145° F.) and 18 minutes of sunshine and rain (rain simulated by tap water introduced onto the panels as a spray under 15 pounds pressure). Because of the extremely rough surfaces of the dried coatings, the conventional rating systems for expressing weathering resistance in term of degree of chalking, blistering, peeling, rusting, etc., were not practical. Consequently all panels in both weathering tests were evaluated for overall condition only after their various periods of exposure. The following Table 3 presents results of accelerated weathering tests and the following Table 4 presents results of outdoor weathering tests.

From the weathering test data reported in the preceding Tables 3 and 4, it is apparent that the polyurethane film coatings containing silicon carbide exhibit superior weathering resistance, both under the accelerated and outdoor weathering tests, to the polyurethane film coatings without silicon carbide.

The instant coating composition has shown unexpected ease of handling and has shown itself superior to the coating products presently on the market. The convenience of application and unique physical properties will allow the coating to be used in a variety of utilities such as tanker liners, boat hulls, construction materials, and hospital and laboratory floors where it is desirable to have a surface which is chemical resistant and electrically non-conductive.

I claim:

1. A sprayable protective coating composition for imparting corrosion and slip resistance to the surface coating comprising an organic solvent solution of an oxidative polymerizable polyurethane resin characterized by the absence of any significant amounts of free isocyanate groups, granular silicon carbide particles dispersed uniformly through said solution, said particles being present in an amount by weight of between ½ to 2 parts per part of resin solids, and said solvent being present in an amount by weight of not less than about 25% of said composition.

2. The sprayable coating composition of claim 1 in which 25 to 50 percent of the coating composition's weight constitutes granular silicon carbide particles of which all particles are smaller than 500 microns with greater than about 97 to 98 percent of the particles being smaller than 149 microns and with the mean average particle size falling between 5 and 50 microns.

TABLE 3.—ACCELERATED WEATHERING TESTS [1]

| | Rating [2] after indicated hours of exposure | | | | | | | | | |
|---|---|---|---|---|---|---|---|---|---|---|
| | 100 | | 200 | | 350 | | 750 | | 1,000 | |
| Test panel coating identity | 3 mil [3] | 6 mil [3] | 3 mil [3] | 6 mil [3] | 3 mil [3] | 6 mil [3] | 3 mil [3] | 6 mil [3] | 3 mil [3] | 6 mil [3] |
| Control | 3 | 3 | 3 | 3 | 2 | 2 | 0 | 0 | 0 | 3 |
| Ex. IV | 4 | 4 | 4 | 4 | 4 | 4 | 4 | 4 | 3 | 0 |
| Ex. V | 4 | 4 | 4 | 4 | 4 | 4 | 4 | 4 | 3 | 3 |
| Ex. VI | 4 | 4 | 4 | 4 | 4 | 4 | 4 | 4 | 2–3 | 3 |
| Ex. VII | 4 | 4 | 4 | 4 | 4 | 4 | 4 | 4 | 3 | 3 |
| Ex. VIII | 4 | 4 | 3 | 4 | 2 | 3 | 2 | 2 | 0 | 0 |

[1] Duplicate panels exposed in Atlas Twin Arc Weatherometer, cycled to simulate 102 minutes of sunshine and 18 minutes of sunshine and rain.
[2] Coatings were comparatively rated for overall failure where 4=none, 3=slight, 2=moderate, 1=severe, and 0=total failure.
[3] Dry film coating thickness.

TABLE 4.—OUTDOOR WEATHERING TESTS [1]

| Test panel coating identity | Rating | | Comments |
|---|---|---|---|
| | 4 mils [2] | 8 mils [2] | |
| Control | 1 | 1 | Gross change in appearance. |
| Ex. IV | 2.3 | 3 | |
| Ex. V | 2–3 | 2–3 | |
| Ex. VI | 3 | 3 | Slight fading. |
| Ex. VII | 3 | 3 | Do. |
| Ex. VIII | 2 | ([3]) | |

[1] After 13 months of outdoor exposure (duplicate panels facing south at 60° angle) the film coatings were comparatively rated for overall failure where 4=none, 3=slight, 2=moderate, 1=severe, and 0=total failure.
[2] Dry film coating thickness.
[3] No panels tested.

3. The sprayable coating composition of claim 1 which comprises the following:

| | By weight of the composition |
|---|---|
| 40–70 percent solids solution of an oxidative polymerizable polyurethane resin in an organic solvent therefor. | Balance (a) of composition. |
| Mineral spirits or xylol solvent. | To make at least 25% (b) total solvent contetnt. |
| Granular silicon carbide particles of a size smaller than 500 microns and of an average particle size between 5 and 50 microns. | 25 to 50% (a). |
| Dispersing agent | Less than 1%. |
| Driers | Less than |
| Antiskin agent | less Than |
| To total | 100%. | wherein
(a) the amounts of said solid solution and said particles are such as to provide a ratio by weight of ½ to 2 parts of said particles for each part of oxidative polymerizable resin solids, and
(b) the at least 25% total solvent content includes the solvent contained in said solids solution of the oxidative polymerizable polyurethane resin, and
which said sprayable coating composition, after application and drying, is characterized by exhibiting resistance to various environmental exposures superior to said coating composition without the granular silicon carbide particles after its application and drying.

4. The coatng composition as set forth in claim 1 wherein said polyurethane resin has an NCO/OH ratio of 1 or less.

5. The composition as set forth in claim 1 wherein said particles of silicon carbide are in the size range of between —200 to 400 mesh, and wherein said composition includes a dispersing agent for said particles.

6. The composition as set forth in claim 5 further including a drier and an anti-skinning agent.

7. The composition as set forth in claim 1 further including a colorant material.

8. The composition as set forth in claim 1 wherein said granular silicon carbide constitutes between 25% and 50% of the total composition weight.

9. The composition as set forth in claim 1 wherein said organic solvent is a mixture of organic solvents.

10. The coating composition as set forth in claim 6 wherein all components thereof are packaged in a single container.

References Cited

UNITED STATES PATENTS

| 3,020,139 | 2/1962 | Camp et al. | 51—295 |
| 3,177,167 | 4/1965 | Skreckoski et al. | |
| 3,224,988 | 12/1965 | Skreckoski. | |

ALLAN LIEBERMAN, Primary Examiner

L. T. JACOBS, Assistant Examiner

U.S. Cl. X.R.

260—37